A. SIPPLE.
SAW GUIDE.
APPLICATION FILED MAR. 21, 1922.
1,430,762.
Patented Oct. 3, 1922.
2 SHEETS—SHEET 2.
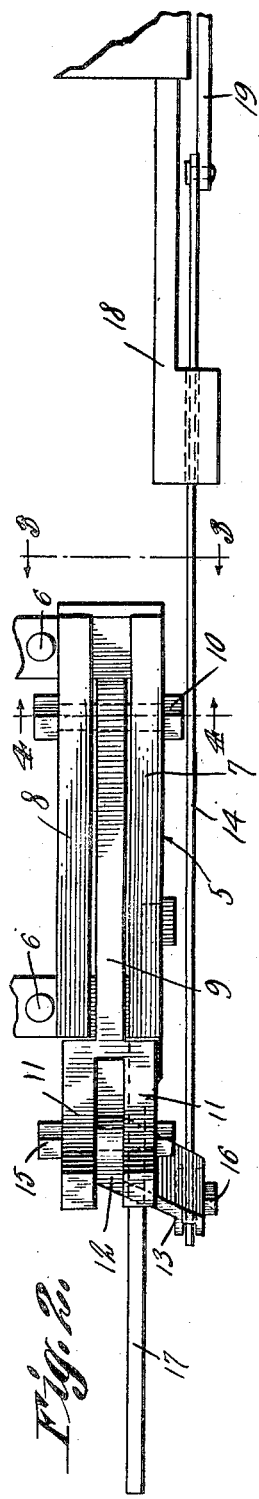
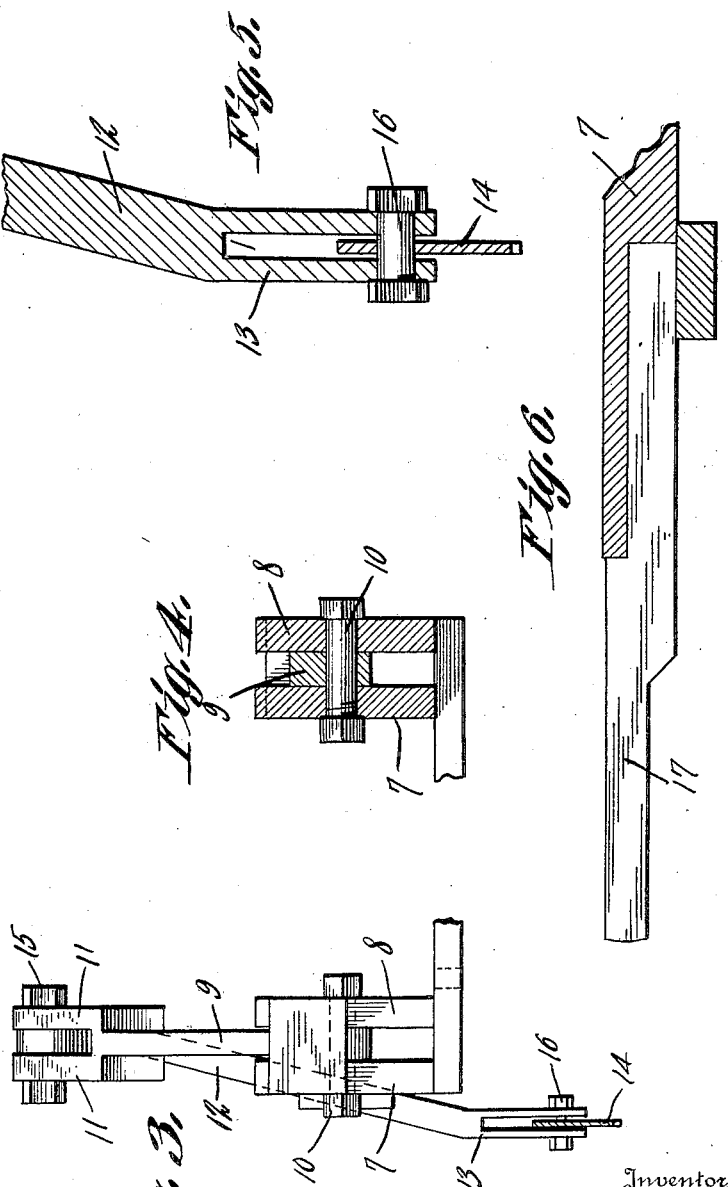
Inventor,
A. Sipple.
By C. A. Snow & Co.
Attorneys.

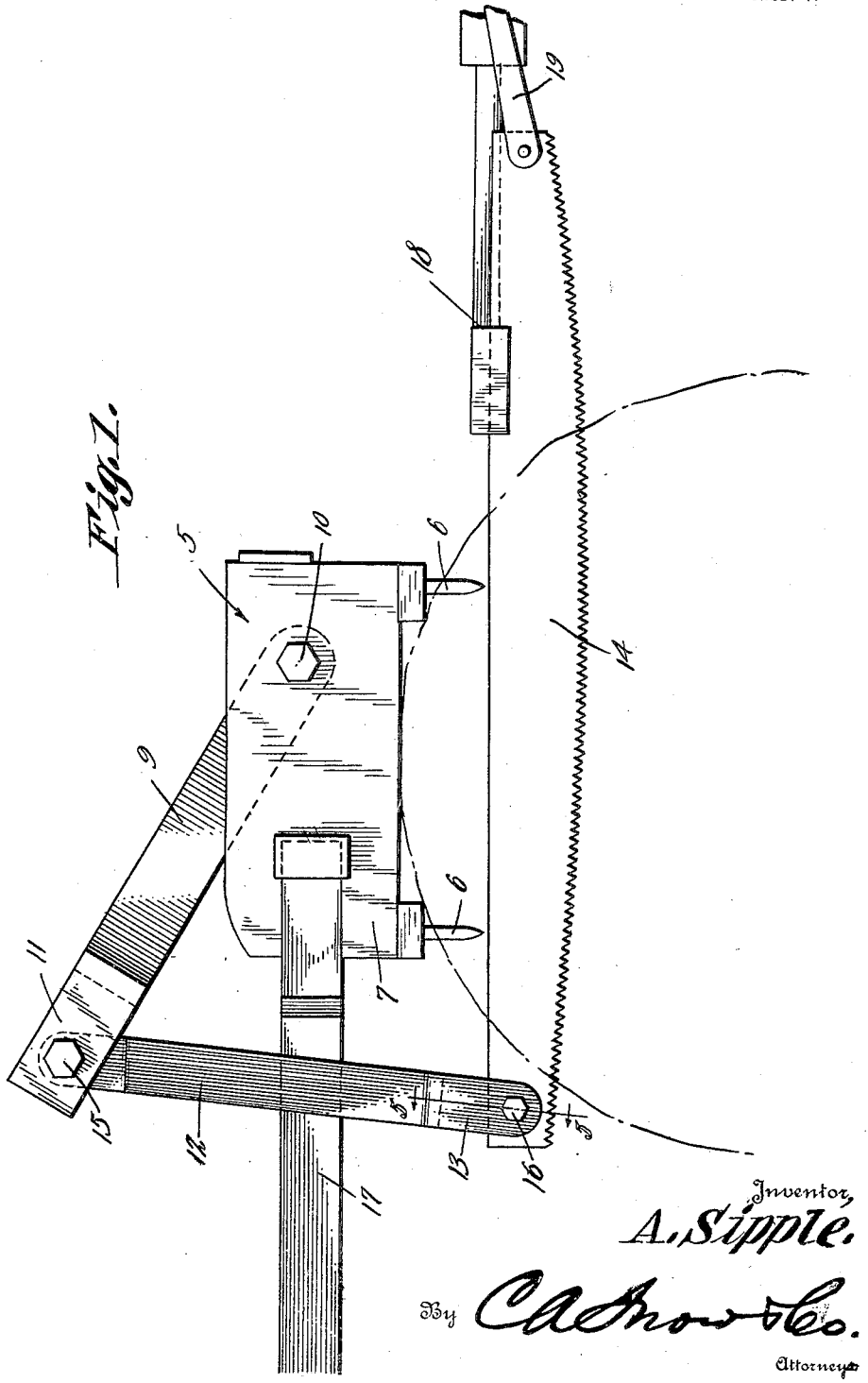

Patented Oct. 3, 1922.

1,430,762

UNITED STATES PATENT OFFICE.

ALVIE SIPPLE, OF WHITNEY, OREGON.

SAW GUIDE.

Application filed March 21, 1922. Serial No. 545,425.

*To all whom it may concern:*

Be it known that I, ALVIE SIPPLE, a citizen of the United States, residing at Whitney, in the county of Baker and State of Oregon, have invented a new and useful Saw Guide, of which the following is a specification.

This invention has reference to wood sawing machines, and more particularly to a novel means for holding a saw in direct alignment with the arm which has connection with the saw and which causes the saw to reciprocate.

Another object of the invention is to provide means having connection with the outer end of the saw for preventing lateral movement of the outer end of the saw, during the sawing operation.

A still further object of the invention is the provision of means for securing the machine to a log or the like to insure the true operation of the saw.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view of the sawing machine showing the same as positioned on a log.

Figure 2 is a plan view of the same.

Figure 3 is a sectional view taken on line 3—3 of Figure 2.

Figure 4 is a sectional view taken on line 4—4 of Figure 2.

Figure 5 is a sectional view taken on line 5—5 of Figure 1.

Figure 6 is a fragmental detail view disclosing the connection between the steadying arm and its support.

Referring to the drawings in detail, the machine embodies a body portion 5 provided with spikes 6 on the lower edge thereof, the spikes being designed for the purpose of supporting the body portion 5 on a log or like article under operation.

This body portion 5 is formed of spaced arms 7 and 8 respectively between which operates the bar 9 which has pivotal connection with the body portion as by means of the bolt 10 which passes through suitable registering openings in the bar 9 and spaced bars of the body portion.

Formed at one end of the bar 9 are spaced arms 11 between which moves one end of the link 12 which has a lower offset portion 13 that connects with the saw proper 14. A bolt 15 connects the link 12 and bar 9, while the bolt 16 connects the link 12 with the saw, the connections being such as to permit of pivotal movement of one member with respect to the other.

Extending forwardly from the body portion 5 is a steadying arm 17 which has connection with the body portion as through the lapped joint clearly illustrated by Figure 6 of the drawings. As clearly shown by Figure 1, the link 12 has one of its side faces contacting with the steadying arm 17 so that lateral movement of the free end of the saw will be prevented.

The saw proper may have connection with a suitable power device such as an engine, as through the medium of the arm 19 which has connection with the saw. A guiding arm 18 is provided to steady the forward end of the saw.

In the operation of the machine, it will be seen that as the saw reciprocates, the outer end of the saw is prevented from moving laterally, or what is commonly known as flapping, to the end that the saw may be forced through its work, eliminating any possibility of the same buckling.

Having thus described the invention, what is claimed as new is:—

A sawing machine including a body portion, said body portion including spaced members, a bar having one end pivotally supported between the spaced members, a pair of spaced arms formed at the opposite end of the bar, a link having one end disposed between the spaced arms and having an offset portion at the opposite end thereof, means for pivotally connecting the saw to the arms, and means contacting with the arm for steadying the outer end of the saw.

In testimony that I claim the foregoing as my own, I have hereto affixed my signature in the presence of two witnesses.

ALVIE SIPPLE.

Witnesses:
E. A. LANDIS,
CHAS. MCMAHON.